J. A. GANSTER.
ROLLER BEARING.
APPLICATION FILED JAN. 5, 1920.

1,374,560.

Patented Apr. 12, 1921.
2 SHEETS—SHEET 1.

Witness
Frank E. French.

Inventor
Joseph A. Ganster
By
Augustus B. Stoughton
Attorney

J. A. GANSTER.
ROLLER BEARING.
APPLICATION FILED JAN. 5, 1920.

1,374,560.

Patented Apr. 12, 1921.
2 SHEETS—SHEET 2.

Witness:-
Frank E French.

Inventor
Joseph H Ganster
By
Augustus B Stoughton
Attorney

UNITED STATES PATENT OFFICE.

JOSEPH A. GANSTER, OF PHILADELPHIA, PENNSYLVANIA.

ROLLER-BEARING.

1,374,560.　　　　Specification of Letters Patent.　　Patented Apr. 12, 1921.

Application filed January 5, 1920. Serial No. 349,364.

*To all whom it may concern:*

Be it known that I, JOSEPH A. GANSTER, a citizen of the United States, residing at Philadelphia, in the county of Philadelphia and State of Pennsylvania, have invented certain new and useful Improvements in Roller-Bearings, of which the following is a specification.

The principal object of the present invention is to provide an annular bearing, resembling a taper bearing, but in which cylindrical rollers are employed and in which such rollers are compelled to coöperate with the other parts or elements of the bearing in such a way that the general effect is substantially like pure rolling motion.

The invention will be claimed at the end hereof but will be first described in connection with the accompanying drawings forming part hereof and in which—

Figure 1:
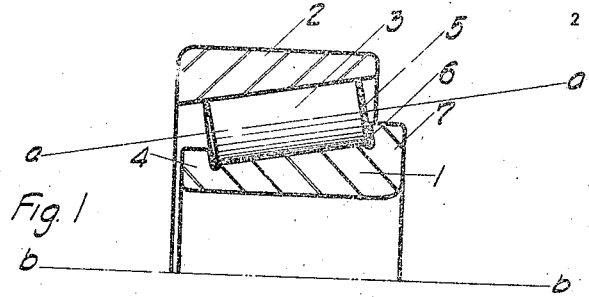
Figure 1, is a cross-sectional view of one-half of a bearing embodying features of the invention.
Figure 2:
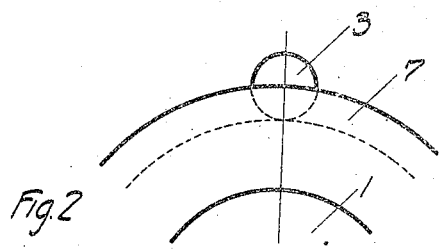
Fig. 2, is an end view showing one roller and the inner ring.
Figure 3:
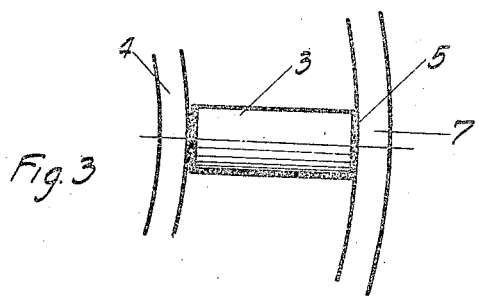
Fig. 3, is a schematic and distorted illustrative view intended to illustrate arcuate and polar contacts at the ends of the rollers.
Figure 4:
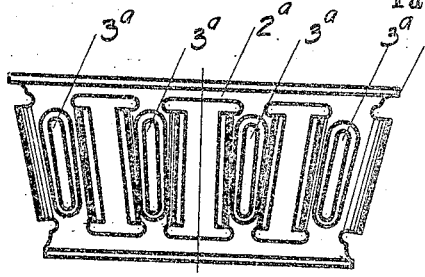
Fig. 4, is a side view of a cage especially adapted for and essential to the operation of the bearing.
Figure 5:
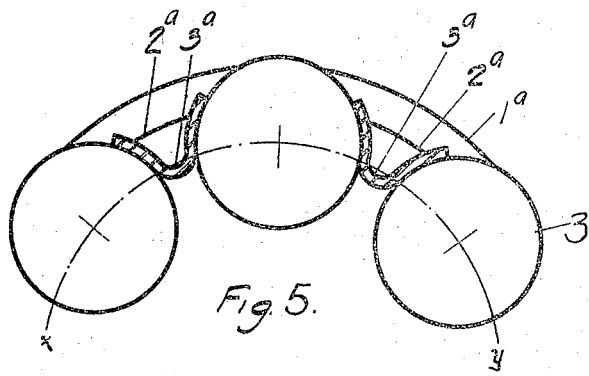
Fig. 5, is an end view, partly in section, illustrating the essential characteristic of the cage whereby it coöperates in the combination.

In the drawings 1 and 2, are inner and outer rings having parallel opposed roller races inclined at the same angle in respect to the common axis $b-b$, of the rings. The inner ring 1, is provided with a pair of spaced parallel shoulders 4 and 7, of which one 7, is reëntrant in respect to the axis of the bearing but not to the raceway and the other 4, is flaring. There is a circle of cylindrical rollers 3, arranged between the races and between the shoulders 4 and 7. These rollers have their ends 5, rounded on substantially the radius of the shoulder 7, that they are thus arranged for arcuate contact at one end, in the drawings the right-hand end, with the rim of the shoulder 7, and for polar contact, at the other end, with the rim of the flaring shoulder 4. The arcuate and polar contacts are shown at the right and left, respectively, in Fig. 3, and in that figure the shoulders are laterally deformed to their radius in order to illustrate the polar and arcuate contacts as they really occur by reason of the taper shape of the rings and the shape of the shoulders and the inclination of the rollers. The portions $3^a$, of the cage or separator $1^a$, which are pushed or struck inward from the part $2^a$, contact with a considerable portion of the cylindrical surfaces of the rollers 3, inside and outside of the orbit $x-y$, described by the axes of the rollers.

The described construction which provides the polar and complete arcuate contacts at the ends of the rollers leaves them very free to accommodate themselves to the slippage which is inevitable by reason of their cylindrical shape and the conical shape of the races, but this is corrected by the parts $3^a$, of the cage which extends inward beyond the centers of the rollers and contact with a very considerable extent of their cylindrical surfaces, with the result that substantially pure rolling motion is attained.

I claim:

A roller bearing comprising the combination of inner and outer rings having parallel opposed roller races inclined at the same angle in respect to the common axis of the rings and whereof the inner one is provided with a pair of spaced parallel shoulders, a circle of cylindrical rollers arranged between the races and between the shoulders and having their ends rounded on substantially the radius of one of the shoulders and arranged for continuous arcuate surface contact at one end with the rim of the last mentioned shoulder and for polar contact with the rim of the other shoulder to facilitate slip of the rollers due to their cylindrical form, and a cage or separator contacting over a large area with the cylindrical surface of the rollers inside and outside of the orbit described by their axes to control slip and maintain axial alinement, substantially as described.

JOSEPH A. GANSTER.